United States Patent
Wentink

(10) Patent No.: US 8,374,123 B2
(45) Date of Patent: Feb. 12, 2013

(54) COLLISION AVOIDANCE SYSTEMS AND METHODS

(75) Inventor: Menzo Wentink, Utrecht (NL)

(73) Assignee: Intellectual Ventures I LLC, Wilmington, DE (US)

( * ) Notice: Subject to any disclaimer, the term of this patent is extended or adjusted under 35 U.S.C. 154(b) by 297 days.

(21) Appl. No.: 11/557,516

(22) Filed: Nov. 8, 2006

(65) Prior Publication Data
US 2007/0115853 A1    May 24, 2007

Related U.S. Application Data

(60) Provisional application No. 60/735,024, filed on Nov. 8, 2005, provisional application No. 60/758,595, filed on Jan. 11, 2006.

(51) Int. Cl.
*H04W 4/00* (2009.01)

(52) U.S. Cl. ........ 370/328; 370/252; 370/389; 370/471; 370/255; 370/445; 370/449; 370/431; 370/229; 370/338; 370/462; 370/441; 370/437; 370/230; 370/278; 370/329; 370/447; 370/448; 370/231; 370/232; 370/233; 370/234; 370/235; 370/236; 370/237; 370/238; 370/330; 370/336; 370/337; 445/552.1; 445/450; 445/451; 445/452.1; 445/453; 709/223; 709/226

(58) Field of Classification Search .................. 370/252, 370/328, 389, 471, 255, 445, 449, 431, 229, 370/338, 462, 441, 437, 230, 278, 329, 447, 370/448, 231, 232, 233, 234, 235, 236, 237, 370/238, 330, 336, 337; 455/552.1, 450, 455/451, 452.1, 453; 709/223, 226
See application file for complete search history.

(56) References Cited

U.S. PATENT DOCUMENTS

| | | | |
|---|---|---|---|
| 7,054,296 B1 | 5/2006 | Sorrells et al. | |
| 7,164,671 B2 | 1/2007 | Del Prado et al. | |
| 7,251,232 B1 | 7/2007 | Meier | |
| 7,698,550 B2 | 4/2010 | Abhishek et al. | |
| 2002/0163933 A1 | 11/2002 | Benveniste | |
| 2003/0112780 A1* | 6/2003 | Ouyang et al. | 370/338 |
| 2003/0123405 A1 | 7/2003 | Del Prado et al. | |
| 2003/0161340 A1 | 8/2003 | Sherman | |
| 2003/0174690 A1* | 9/2003 | Benveniste | 370/350 |
| 2004/0143681 A1* | 7/2004 | Benveniste | 709/249 |
| 2004/0181597 A1* | 9/2004 | Ekl et al. | 709/227 |
| 2004/0258039 A1* | 12/2004 | Stephens | 370/349 |
| 2005/0068900 A1 | 3/2005 | Stephens et al. | |
| 2005/0135295 A1* | 6/2005 | Walton et al. | 370/328 |
| 2005/0238016 A1* | 10/2005 | Nishibayashi et al. | 370/389 |
| 2005/0281225 A1 | 12/2005 | Mishra et al. | |
| 2006/0034219 A1 | 2/2006 | Gu et al. | |

(Continued)

FOREIGN PATENT DOCUMENTS

| | | |
|---|---|---|
| EP | 1 351 414 | 10/2003 |
| EP | 1 429 494 | 6/2004 |

(Continued)

OTHER PUBLICATIONS

ANSI-IEEE Std 802.11, 1999 Edition (R2003).*

(Continued)

*Primary Examiner* — Charles Appiah
*Assistant Examiner* — Alexander Yi

(57) ABSTRACT

Disclosed herein are various embodiments of collision avoidance systems and methods. One method embodiment, among others, comprises a client sending an end of transmission (EOT) request to an access point (AP), and responsive to the EOT request, the AP responding with an EOT frame.

29 Claims, 8 Drawing Sheets

U.S. PATENT DOCUMENTS

| | | | |
|---|---|---|---|
| 2006/0245369 A1* | 11/2006 | Schimmelpfeng et al. | ... 370/252 |
| 2007/0008922 A1 | 1/2007 | Abhishek et al. | |
| 2007/0014237 A1 | 1/2007 | Nishibayashi et al. | |
| 2007/0054632 A1 | 3/2007 | Lu et al. | |
| 2007/0160021 A1 | 7/2007 | Xhafa et al. | |
| 2007/0171858 A1 | 7/2007 | Grandhi et al. | |
| 2007/0217352 A1 | 9/2007 | Kwon | |
| 2009/0310619 A1 | 12/2009 | Brommer | |

FOREIGN PATENT DOCUMENTS

| | | |
|---|---|---|
| JP | 2001-339391 | 12/2001 |
| JP | 2003-008587 | 1/2003 |
| JP | 2009-522930 | 6/2009 |
| WO | WO-2005/039105 | 4/2005 |
| WO | WO-2007/056747 | 5/2007 |
| WO | WO-2007/081683 | 7/2007 |

OTHER PUBLICATIONS

International Search Report and Written Opinion.

Fischer, Michael, "QoS Baseline Proposal," IEEE 802.11 Standards Committee, Document IEEE 802.11-00/360R1, Nov. 7, 2000, 73 pages.

International Preliminary Report on Patentability for PCT/US2006/060663, issued May 14, 2008.

International Preliminary Examination Report for PCT/US2006/060663, completed Jun. 18, 2009.

Non-final Office Action on U.S. Appl. No. 11/651,879, mailed Aug. 4, 2010.

Non-Final Office Action on U.S. Appl. No. 11/651,879, mailed Jun. 18, 2009.

Notice of Allowance on U.S. Appl. No. 11/651,879, mailed Jun. 9, 2011.

Non-Final Office Action on U.S. Appl. No. 13/251,772, mailed Feb. 15, 2012.

Notice of Allowance on U.S. Appl. No. 13/251,772, mailed Jun. 4, 2012.

Extended European Search Report for EP Application 07710033.7, dated Jul. 3, 2012.

Final Office Action on U.S. Appl. No. 11/651,879, mailed Dec. 8, 2010.

Search Report for co-pending PCT Application No. PCT/US06/060663 dated Dec. 3, 2007, as well as Written Opinion dated Oct. 29, 2007.

Non-Final Office Action on U.S. Appl. No. 13/591,654, mailed Oct. 16, 2012.

* cited by examiner

200b

502

CLIENT SENDS AN RTS TO AN AP AT ANY RATE THE CLIENT KNOWS WILL REACH THE AP

504

AP SETS A NAV BY SENDING A CTS THAT CAN BE DECODED BY ALL NODES IN A NETWORK

COLLISION AVOIDANCE SYSTEMS AND METHODS

CROSS-REFERENCE TO RELATED APPLICATIONS

This application claims priority to U.S. provisional applications entitled, "Avoiding EIFS," having Ser. No. 60/735,024, filed Nov. 8, 2005, and "CF-End Response," having Ser. No. 60/758,595, filed Jan. 11, 2006, both of which are entirely incorporated herein by reference.

BACKGROUND OF THE INVENTION

1. Field of the Invention

The present disclosure is generally related to communication systems and methods and, more particularly, is related to collision avoidance systems and methods in a wireless network.

2. Related Art

Communication networks come in a variety of forms. Notable networks include wireline and wireless. Wireline networks include local area networks (LANs), DSL networks, and cable networks, among others. Wireless networks include cellular telephone networks, classic land mobile radio networks and satellite transmission networks, among others. These wireless networks are typically characterized as wide area networks. More recently, wireless local area networks and wireless home networks have been proposed, and standards, such as Bluetooth and IEEE 802.11, have been introduced to govern the development of wireless equipment for such localized networks.

A wireless local area network (LAN) typically uses infrared (IR) or radio frequency (RF) communication channels to communicate between portable or mobile computer terminals and access points (APs) or base stations. These APs are, in turn, connected by a wired or wireless communications channel to a network infrastructure which connects groups of access points together to form the LAN, including, optionally, one or more host computer systems.

Wireless protocols such as Bluetooth and IEEE 802.11 support the logical interconnections of such portable roaming terminals having a variety of types of communication capabilities to host computers. The logical interconnections are based upon an infrastructure in which at least some of the terminals are capable of communicating with at least two of the APs when located within a predetermined range, each terminal being normally associated, and in communication, with a single one of the access points. Based on the overall spatial layout, response time, and loading requirements of the network, different networking schemes and communication protocols have been designed so as to most efficiently regulate the communications.

IEEE Standard 802.11 ("802.11") is set out in "Wireless LAN Medium Access Control (MAC) and Physical Layer (PHY) Specifications" and is available from the IEEE Standards Department, Piscataway, N.J. The IEEE 802.11 standard permits either IR or RF communications at 1 Mbps, 2 Mbps and higher data rates, a medium access technique similar to carrier sense multiple access/collision avoidance (CSMA/CA), a power-save mode for battery-operated mobile stations, seamless roaming in a full cellular network, high throughput operation, diverse antenna systems designed to eliminate "dead spots," and an easy interface to existing network infrastructures. The IEEE Standard 802.11b extension supports data rates up to 11 Mbps.

One problem that may occur in wireless LAN (WLAN) systems involves the use of extended interframe space (EIFS). As is known, EIFS is a time during which backoff is suspended, which is long enough to allow for transmission of an acknowledgment (ACK) frame from a hidden node. In general, an EIFS is started when a PHY header is received correctly, but the MAC header is not (e.g., the frame check sequence (FCS) failed). If the ACK transmission is not actually hidden in the physical sense (e.g., the PHY header can be received) but the MAC portion cannot be decoded, the station starts a new EIFS at the end of the ACK transmission, while in practice it should have continued its backoff at that time. Furthering this problem is the fact that the ACK transmission may be much shorter than the EIFS duration (which is based on the lowest mandatory PHY rate), especially in the 802.11g standard where EIFS is 320 microseconds and an orthogonal frequency division multiplexing (OFDM) ACK transmission plus short interframe space (SIFS) may be as short as 34 microseconds. Such disparity in durations introduces a significant unfairness for nodes which start an EIFS versus those nodes which can decode the MAC portion of the frame and hence continue backoff immediately after the ACK transmission.

Another problem that may occur in WLAN systems involves the resetting of a network allocation vector (NAV) by clients, through the transmission of a CF-End frame at the end of a transmit opportunity (TXOP). One issue that may arise when a client resets a NAV by transmitting a CF-End frame is that this CF-End frame may not be received by all nodes in the basic service set (BSS) because the client may not be near the center of the BSS. In this case, the NAV is reset only in part of the BSS.

SUMMARY

Embodiments of the present disclosure provide collision avoidance systems and methods in a wireless network. One method embodiment, among others, comprises a client sending an end of transmission (EOT) request to an access point (AP), and responsive to the EOT request, the AP responding with an EOT frame.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
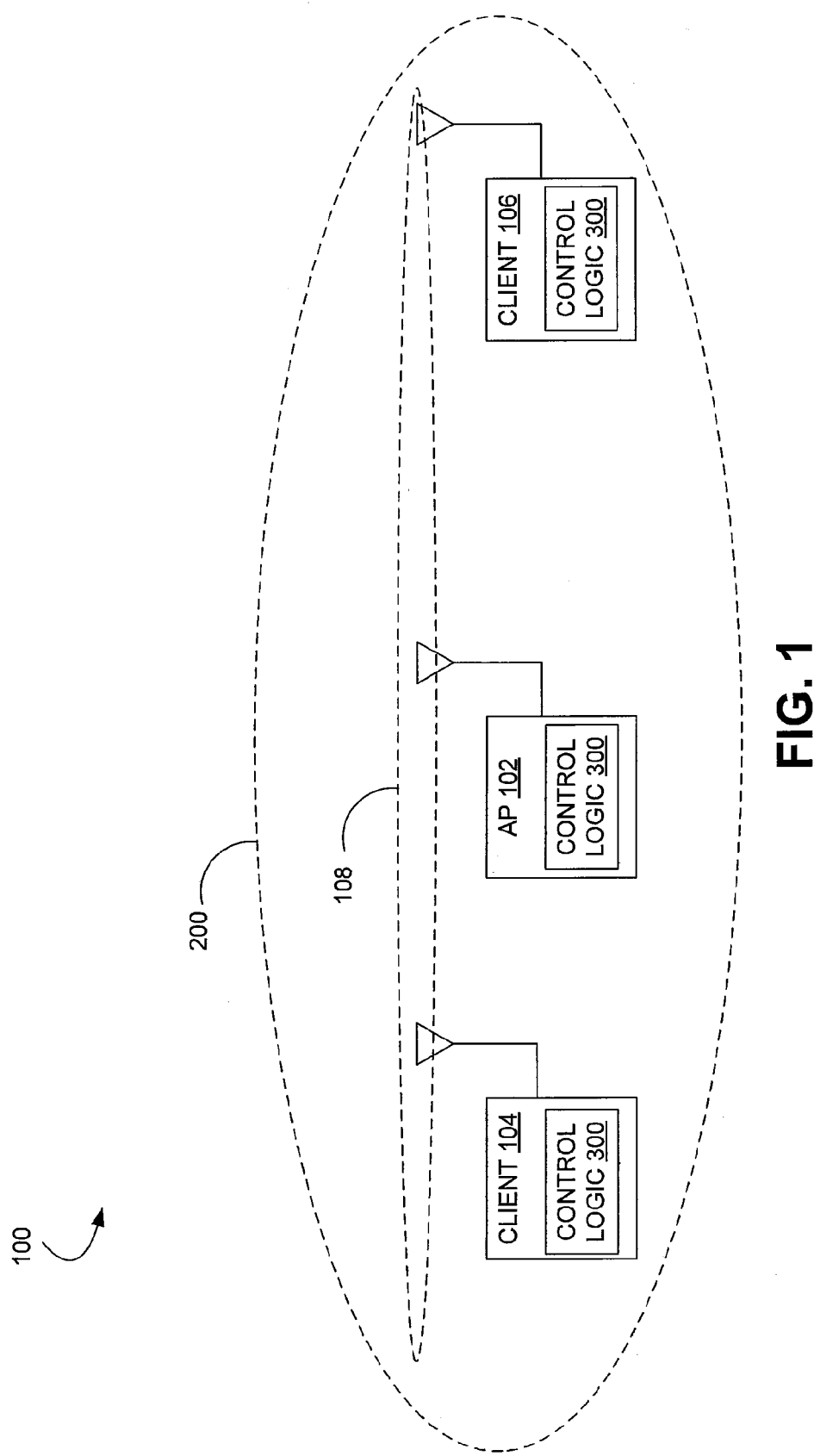
FIG. 1 is a block diagram of an exemplary environment in which various embodiments of a collision avoidance (CA) system may be implemented.

Disclosed herein are various embodiments of collision avoidance systems in a wireless network (herein, simply collision avoidance system(s) or CA system(s)). As explained in the background, one problem found in conventional wireless local area network (WLAN) systems is that stations that receive a PHY header but do not decode the MAC portion start an extended interframe space (EIFS) at the end of a transmission. In contrast, those stations that can decode the MAC header continue their backoff immediately after the transmission. This difference in processing leads to an unfairness among nodes in a network in that stations that resume backoff may begin access to the wireless medium before those stations that start an EIFS. One way to avoid this unfair EIFS is by setting a network allocation vector (NAV) that ends at the end of the ACK (or final) transmission. All data transmission datagrams carry a duration value (which determines the NAV) in the MAC header that covers the ACK transmission. However, one issue is that the MAC header can generally not be decoded by all nodes in the network (e.g., the data rate is too high, is not supported by the station, etc.).

Certain embodiments of the CA systems address these and other problems in various ways. In some embodiments, the stations may send an EOT (end of transmit opportunity (TXOP)) request frame to the AP, to which the AP responds with the actual EOT frame. In one embodiment, the EOT frame comprises a short frame that can be received by all stations in the BSS, so that after the EOT transmission, all stations in the BSS will resume their backoff at the same time (rather than some starting an EIFS and some not). Such an EOT request frame may be "piggybacked" on existing MAC frames such as a CF-End, or a new MAC frame can be defined for it.

Related to the issue of EIFS avoidance and addressed by the various CA system embodiments is resets of the NAV. As is known, the 802.11 standard provides several methods to activate the NAV, most notably via the request to send (RTS)/clear to send (CTS) mechanisms. The RTS and the CTS each set a NAV locally around the respective senders of the RTS and the CTS. In 802.11, the NAV can be reset by the AP through the transmission of a CF-end frame, but in 802.11n, stations also are allowed to reset a NAV by transmitting a CF-end. This methodology is referred to as a LongNAV and NAV truncation. A NAV is first set for some long duration of time (e.g., the TXOP limit), and subsequently reset by the transmission of a CF-end when no more pending frames are left. In other words, resetting a NAV is allowed for TXOPs from both the station and the AP, but when the reset derives from a station, the reset signal may not be received by all stations in the BSS. In particular, when the distance between the AP and the station sending the CF-End is large, there may be a considerable area of the BSS where the NAV is not reset because the CF-end was not received. To this end, one embodiment is where the AP is given a right to respond with a CF-End frame a short inter-frame space (SIFS) time after receiving a CF-End that is transmitted by one of the stations in the associated BSS, as can be determined by the fact that the second address inside the CF-End contains the corresponding basic service set identifier (BSSID). Matching the BSSID ensures that only a single AP will send a CF-End response at any time. In this way, the NAV is reset in the entire BSS because the AP transmits the final CF-End. Resetting a NAV through the entire BSS through the CF-End response mechanism implicitly avoids any unwanted EIFS in the BSS.

Although described in the context of a WLAN environment having a basic service set (BSS) configured in an infrastructure mode, the various embodiments of the CA systems described herein can likely be applied to other systems and environments, such as independent BSS (IBSS) systems and ad hoc modes, as well as other communication system environments. Additionally, although IEEE 802.11 is prominently used herein as an example standard used for a wireless network, the systems and methods described may apply to virtually any wireless network known to one of ordinary skill in the art.

FIG. 1 show an exemplary wireless LAN (WLAN) environment 100 in which various embodiments of a collision avoidance (CA) system 200 may be implemented. In general, the CA avoidance system 200 is configured as a basic service set (BSS), which comprises a plurality of stations or nodes (102, 104, and 106). Each of the stations 102, 104, and 106 may be embodied as one of many wireless communication devices, including computers (desktop, portable, laptop, etc.), consumer electronic devices (e.g., multi-media players), compatible telecommunication devices, personal digital assistants (PDAs), or any other type of network devices, such as printers, fax machines, scanners, hubs, switches, routers, set-top boxes, televisions with communication capability, etc.

The CA avoidance system 200 shown in FIG. 1 comprises, in one embodiment, an access point (AP) station 102 (herein, simply AP) and one or more client stations 104, 106 (herein, simply referred to individually as a client or collectively as clients). The CA avoidance system 200 is configured in what may be referred to as an infrastructure mode, whereby clients 104 and 106 communicate frames directly with the AP 102 and not with each other. Included within each of the AP 102 and clients 104, 106 is control logic 300. The control logic 300 implements MAC layer and PHY layer services. The MAC layer services provide the capability for the given station to exchange MAC frames. The MAC frame transmits management, control, or data between stations 102, 104, and 106. After a station forms the applicable MAC frames, the frame's bits are passed to the PHY layer for transmission. One skilled in the art would understand that the control logic 300 can be configured using a plurality of modules (e.g., hardware and/or software), each with distinct functionality, or as a single module.

The control logic 300 can be implemented in hardware, software, or a combination thereof. When implemented in whole or in part by software, control logic 300 is implemented in software stored in a memory and that is executed by a suitable instruction execution system. When implemented in whole or in part by hardware, the control logic 300 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In one embodiment, the control logic 300 may include a PHY layer processor, MAC layer processor, or a combination of both (in the same or separate units), including, but not limited to, a digital signal processor (DSP), a microprocessor (MCU), a general purpose processor, and an application specific integrated circuit (ASIC), among others.

The AP 102 is typically connected to a wired network (e.g., Ethernet), not shown. In general, the clients, such as client 104, connects to the AP 102 through a scanning process. The scanning process can either be performed passively by listening for a beacon transmitted by one or more APs 102, or actively by sending out probes to one or more APs 102 and choosing an AP that provides the best connection (e.g., in terms of signal strength and/or bit error ratio (BER)). After an AP is chosen, such as AP 102, an authentication process occurs between the client 104 and the AP 102, and then association between the same may begin.

Association involves the communication between the clients 104, 106 and the AP 102 via a shared wireless medium 108. In one implementation, the client 106 may represent a hidden node (as that phrase is understood to those having ordinary skill in the art) to client 104, and vice versa. In some implementations, the client 106 may be a station that is capable of receiving the PHY header of a transmission from the client 104 but incapable of decoding the MAC layer, and vice versa. Various mechanisms for signal exchanges are illustrated in FIGS. 2A-7 to highlight various features of the CA system 200. Although described below in the context of the AP 102 or client 104 sending or receiving various transmissions, it would be understood in the context of this disclosure that the effectuating of the various functionality of the CA system 200 is through the control logic 300 of each station (node). Further, the various interframe spaces described in 802.11 and understood by those having ordinary skill in the art are omitted from the various figures (and corresponding description) except where necessary to the understanding of the various embodiments.

Figure 2A:
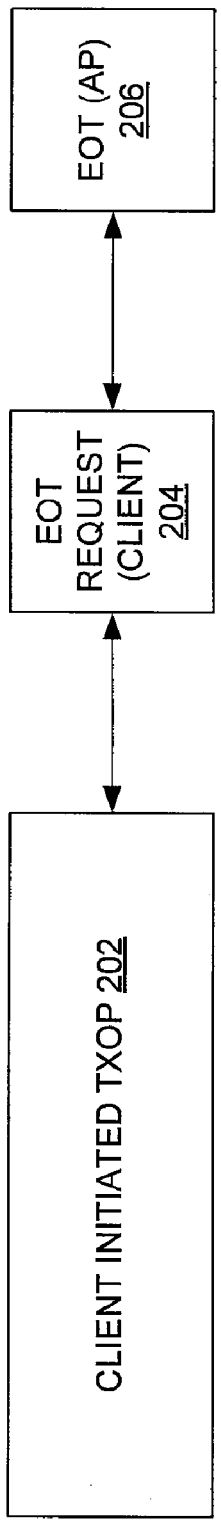
FIGS. 2A-2B are block diagrams that illustrate EIFS avoidance embodiments for client-initiated TXOPs for the CA system of FIG. 1.
Figure 2B:
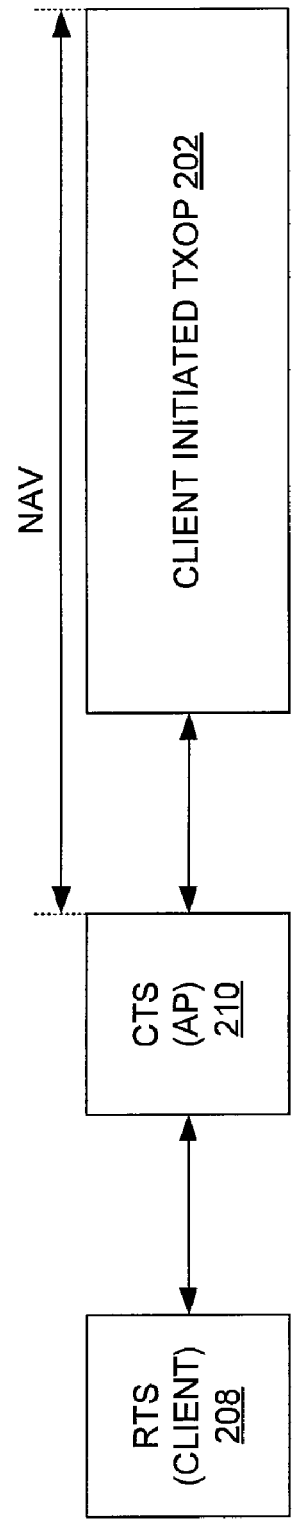

Referring to FIGS. 2A-2B, shown are various mechanisms for addressing EIFS avoidance for a client initiated transmit opportunity (TXOP) 202. Referring to FIG. 2A, the client 104 avoids any EIFS by sending a frame 204 with end of TXOP (EOT) request characteristics, at any rate suitable for reception by the AP 102. The rate may be a basic rate in some embodiments, or a non-basic rate in others. For instance, in 802.11, a basic rate generally refers to a rate that can be supported by all stations in the BSS. A non-basic rate generally refers to a rate that may not be supported by all stations in the BSS, yet is supported by the communicating station and the AP. Note further that reference to a "suitable rate" depends on the implementation, and may encompass use of proprietary or well-known rate adaptation logic to determine a rate for use in communicating with a particular destination, as would be appreciated by one having ordinary skill in the art. The AP 102 responds with a short frame 206 (EOT frame) transmitted at a low basic rate such that all nodes in the associated BSS can decode the frame 206. Note that an EOT frame can be a CF-end (in which case it also includes NAV truncation), ACK, CTS, etc. Without the EOT request indication, a response frame from the AP may have the same PHY characteristics as the frame it is responsive to, but there is no guarantee that these characteristics are shared amongst all nodes in the BSS, correspondingly there is no guarantee that the frame can be received by all stations in the BSS. The EOT frame 206 can also be embodied as an acknowledgement (ACK) frame or block acknowledgement (BA) frame, provided that these frames are transmitted at a rate which can be decoded by all nodes in the BSS. In one embodiment, such a rate can be the lowest basic rate. The EOT frame 206 can also be used to reset any remaining NAV. The EOT frame can also be transmitted by the AP autonomously, for instance a PIFS idle time after any TXOP. In FIG. 2B, the client 104 sends an RTS 208 to the AP 102 at any rate suitable to reach the AP 102, or at a low basic rate. The AP 102 responds with a CTS 210, which due to its low basic rate can be decoded by all nodes in the associated BSS. The CTS 210 sets the NAV until the end of the TXOP, as indicated in the RTS frame 208. The NAV based mechanism works especially well when TXOP PHY modulations that cannot be demodulated by a subset of stations are used, hence these transmissions do not trigger the start of an EIFS in these stations.

Figure 3:
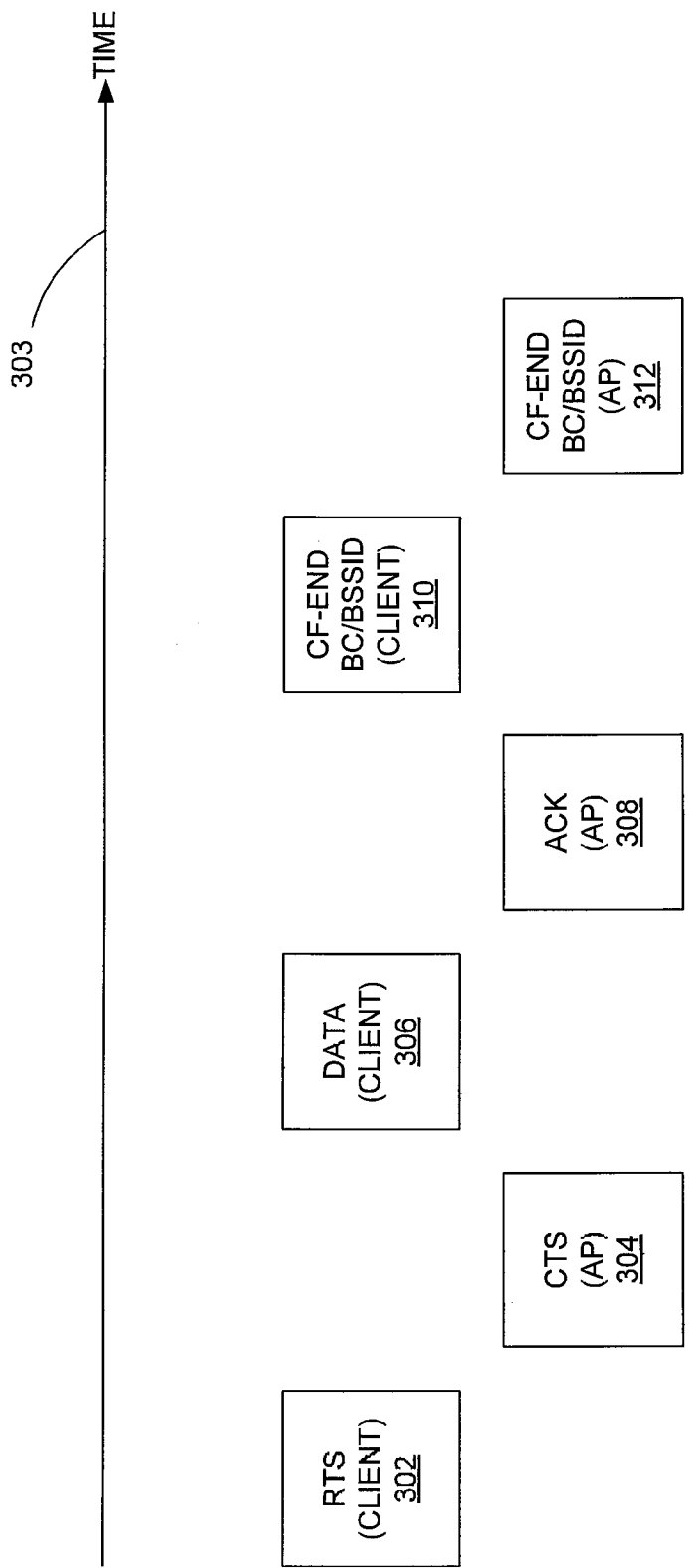
FIG. 3 is a block diagram that illustrates one embodiment of a network allocation vector (NAV) reset mechanism of the CA system of FIG. 1.

Having described various EIFS avoidance mechanisms, the following disclosure is used to describe symmetrical reset of the NAV that can be implemented with the EIFS avoidance embodiments described above or through separate embodiments. Referring to FIG. 3, shown is an exemplary communication between the client 104 and the AP 102. As noted from the diagram, the client transmissions are represented with blocks in the top row (as indicated in the parenthesis as "client") and the AP transmissions are represented with blocks in the bottom row (indicated in parenthesis with "AP"). The sequence advances in time from left to right, as represented by the arrow time line 303. That is, for the exemplary communication shown in FIG. 3, an RTS sent by the client 104 begins the sequence, and a CF-end sent by the AP 102 ends the sequence. In particular, the client 104 sends an RTS 302, which sets a NAV locally around the client 104 (which is not necessarily received by the client 106, as is typical of the hidden node problem). The AP 102 responds by sending a CTS 304, which sets a NAV around the AP 102 and is detected by all nodes (e.g., including hidden nodes, such as client 106) in the associated BSS. Subsequently, the client 104 sends one or more data frames 306 (one exchange is shown, with the understanding that multiple exchanges can occur), and the AP 102 responds with one or more ACK frames 308.

The client 104 sends a CF-end frame 310. The CF-end frame 310 comprises a BSSID field containing the BSSID of the AP 102, which is the MAC address of the AP 102. The CF-end frame 310 also comprises a receive address (RA) field, which contains a broadcast address. The AP 102 responds (e.g., after a short interframe space (SIFS) interval or PCF interframe space (PIFS) interval not shown) with a CF-end response frame 312, which clears the NAV around the AP 102 (which also covers the entire BSS). Thus, the CA system 200 allows the AP 102 to respond to a CF-end frame 310 sent by the client 104. The response by the AP 102 is in the form of the CF-end response frame 312 that comprises a BSSID that matches the BSSID contained in the CF-end frame 310. The BSSID makes the CF-end frame 310 specific to one AP (e.g., AP 102), avoiding collisions between multiple APs transmitting a CF-end response frame 312. In one embodiment, the CF-end frame 310 is the final frame in a TXOP associated with the client 104, and it is an unacknowledged frame. As an unacknowledged frame, it is safe to respond with a CF-end response frame 312 after a SIFS interval.

Note that some implementations of the CA systems 200 may omit the CF-end response frame 312. For instance, when the distance between the AP 102 and the client 104 is small, a single CF-end from either the AP 102 or the client 104 resets the EIFS in the same coverage area because the coverage areas for both devices (e.g., 102 and 104) largely overlap. The determination by the AP 102 to send a CF-end response frame 312 can be based on the estimated distances of the associated clients (e.g., clients 104 and 106), and in some cases, in combination with the estimated distance of the transmitter of the CF-end frame. Such a determination can, for example, further be based on received signal strengths, PHY rates, and/or modulation coding scheme (MCS) used to communicate with the clients, among other mechanisms for providing a determination.

Figure 4:
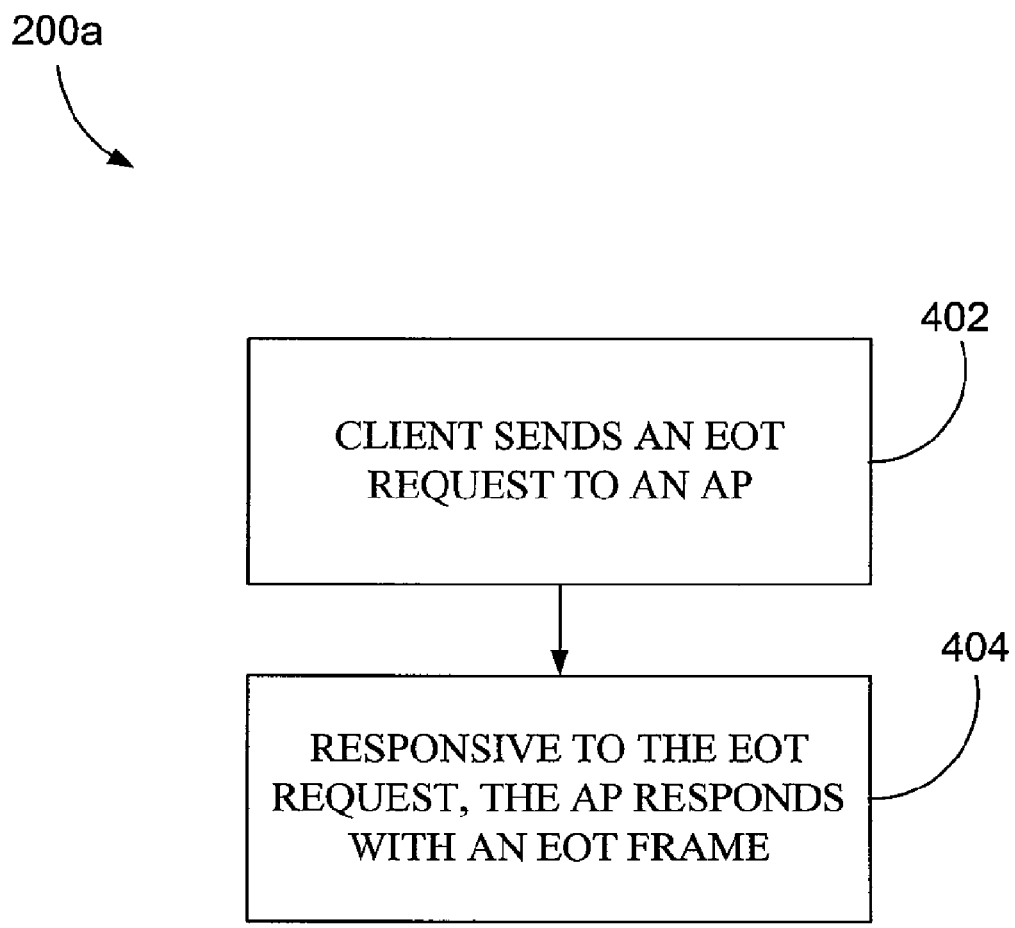
FIG. 4 is a flow diagram that illustrates one method embodiment, among others, corresponding to the mechanisms shown in FIGS. 2A and 3.

Having described certain embodiments of CA systems 200, it would be appreciated in the context of the above disclosure that one method embodiment, referred to as method 200a and shown in FIG. 4, comprises the client sending an EOT request to an AP (402), and responsive to the EOT request, the AP responding with an EOT frame (404).

Figure 5:
FIG. 5 is a flow diagram that illustrates one method embodiment, among others, corresponding to the mechanisms shown in FIG. 2B.

Another embodiment of the CA systems 200, referred to as method embodiment 200b and shown in FIG. 5, comprises the client 104 sending an RTS to the AP 102 at any rate the client 104 knows will reach the AP 102, or at a low basic rate (502). Responsive to the RTS, the AP sets a NAV by sending a CTS that can be decoded by all nodes in the network (504).

It would be appreciated in the context of this disclosure that, although the systems and corresponding methodology are described above in the context of a combination of client and AP devices, other embodiments are considered within the scope of the disclosure. For instance, one method embodiment can be described from the perspective of a particular device (e.g., an AP) in a system, such as receiving an end of transmission (EOT) request, and responsive to the EOT request, responding with an EOT frame. Similarly, another method embodiment may be described (e.g., from the perspective of a client) as sending an end of transmission (EOT) request, and receiving an EOT frame in response to the EOT request. Similar system embodiments are also considered to be within the scope of the disclosure.

Figure 6A:
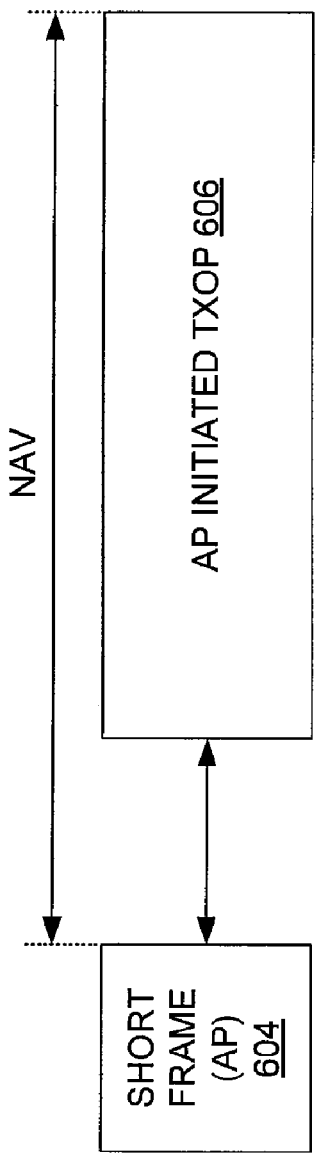
FIGS. 6A-6B are block diagrams of that illustrate EIFS avoidance embodiments for access point-initiated TXOPs for the CA system of FIG. 1.
Figure 6B:
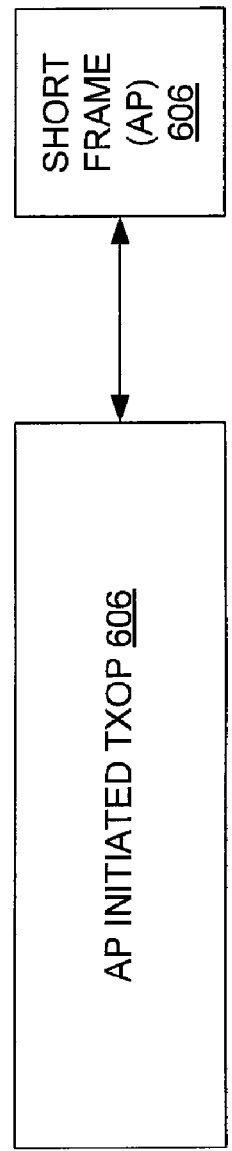

FIGS. 6A-6B show one mechanism used by an embodiment of the CA system 200 to set a NAV and/or avoid EIFS for an AP-initiated TXOP. In general, the TXOP initiated by the AP 102 begins with an RTS or CTS and ends with the last frame sent or received by the AP. Referring to FIG. 6A, the AP 102 sets a NAV prior to a TXOP 602 by starting the TXOP 602 with a short frame 604 (e.g., short to reduce the probability of error) at a low basic rate. The short frame 604 contains a duration value (e.g., the NAV setting) equal to the expected length of the TXOP 602. Referring to FIG. 6B, the AP 102 avoids any EIFS at the end of the TXOP 602 by sending a short frame 606 at a low basic rate as the final frame of the TXOP 602. In each case, the rate is selected such that frames from the AP 102 reach all nodes in the network (e.g., BSS).

Figure 7A:
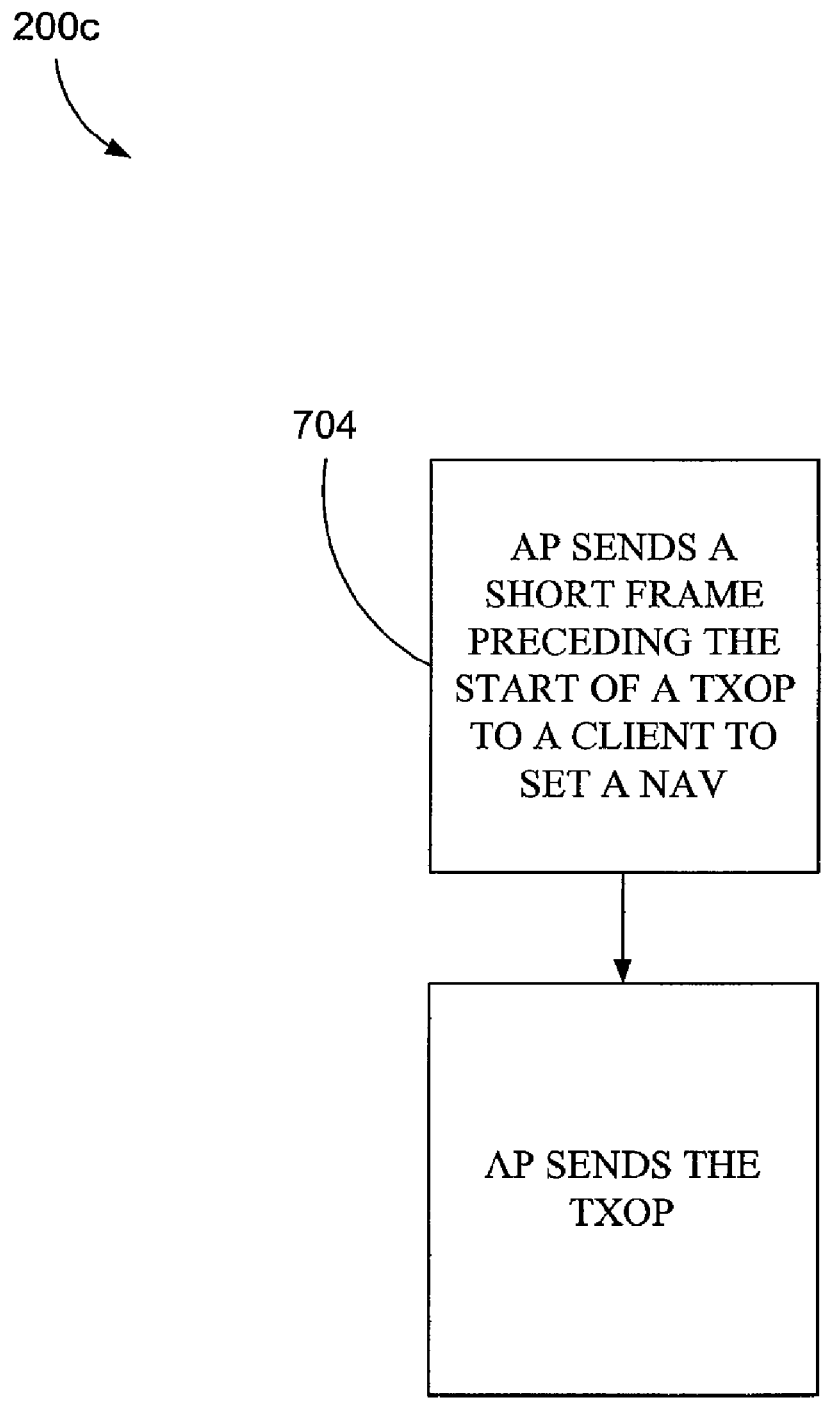
FIGS. 7A-7B are flow diagrams that illustrate EIFS avoidance mechanisms for AP-initiated TXOPs as shown in FIGS. 6A-6B, respectively.

One method embodiment corresponding to the mechanisms shown in FIG. 6A, referred to as CA method 200c and shown in FIG. 7A, comprises an AP sending a short frame preceding the start of a TXOP to a client to set the NAV (702), and sending the TXOP (704).

Figure 7B:
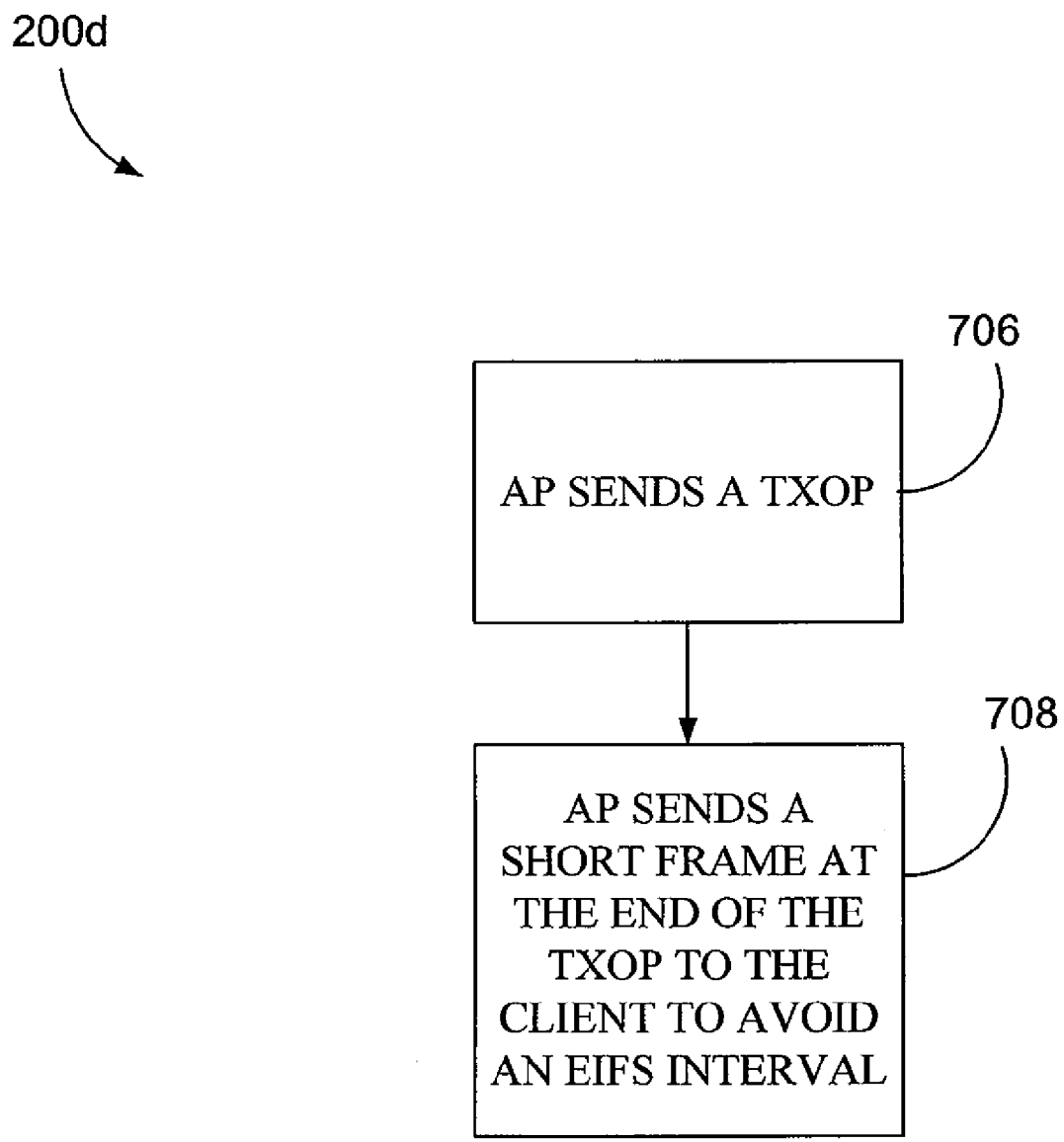

One method embodiment corresponding to the mechanisms shown in FIG. 6B, referred to as CA method 200d and shown in FIG. 7B, comprises the AP sending a TXOP (706) and sending a short frame at the end of the TXOP to the client to avoid the EIFS interval (708).

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method, comprising: receiving an end of transmission (EOT) request at an access point (AP) from a client prior to an end of an existing transmit opportunity (TXOP) between the client and the AP, wherein the EOT request truncates the TXOP early, before a network allocation vector (NAV) clears around the client; and transmitting an EOT frame from the AP responsive to receiving the EOT request, wherein the EOT frame has a receiver address field set to a broadcast address and that is configured to separately truncate the TXOP early, before the network allocation vector clears around the AP prior to the end of the TXOP, such that the EOT frame is to be received by all stations in a basic service set (BSS) so that all stations in the basic service set (BSS) resume their backoff at substantially the same time to avoid an extended interval frame space (EIFS) interval.

2. The method of claim 1, wherein the EOT request sent by the client comprises a contention free end (CF-end) frame.

3. The method of claim 2, wherein the CF-end frame comprises a basic service set identification (BSSID) field indicating a BSSID associated with the AP.

4. The method of claim 1, wherein the client sends the EOT request at a non-basic rate, the non-basic rate being a rate the client knows to be decodable by both the client and the AP but that the client does not know to be decodable by all other nodes in a same basic service set (BSS) as the client and the AP.

5. The method of claim 2, wherein the AP transmitting the EOT frame comprises the AP transmitting a second CF-end frame.

6. The method of claim 5, wherein the second CF-end frame comprises a basic service set identification (BSSID) field indicating a BSSID associated with the AP.

7. The method of claim 6, wherein the second CF-end frame is sent by the AP at a basic rate, the basic rate being a rate decodable by all nodes in a same basic service set (BSS) as the client and AP and including the client and the AP.

8. A method, comprising: receiving a request to send (RTS) frame at an access point (AP), wherein the RTS frame is received at a non-basic rate, the non-basic rate being a rate a client knows to be decodable by both the client and the AP but that the client does not know to be decodable by all other nodes in a same basic service set (BSS) as the client and the AP; and setting a network allocation vector (NAV) at the AP responsive to receiving the RTS frame by transmitting a clear to send (CTS) frame at a basic rate that is configured to truncate a transmit opportunity (TXOPI early, before the network allocation vector clears and prior to the end of the TXOP to avoid an extended interval frame space (EIFS) interval, the basic rate being a rate decodable by the client, the AP, and all of the other nodes in the same BSS as the client and the AP, wherein the basic rate is selected such that the frame from the AP reaches the entire BSS or all nodes in a network to avoid the extended interval frame space (EIFS) interval.

9. A method, comprising: sending a short frame preceding the start of a transmit opportunity (TXOP) from an access point (AP) to a wireless client at a basic rate to set a network allocation vector (NAV), the basic rate being a rate decodable by the client, the AP, and all other nodes in a same basic service set (BSS) as the client and the AP; transmitting and receiving one or more frames at the AP with the client during the TXOP at a non-basic rate, the non-basic rate being a rate decodable by both the client and the AP but not decodable by all of the other nodes in the same BSS as the client and the AP; and transmitting a clear to send (CTS) frame from the AP at a basic rate that is configured to truncate the TXOP early, before the network allocation vector clears and prior to the end of the TXOP to avoid an extended interval frame space (EIFS) interval, wherein the basic rate is selected such that the frame from the AP reaches the entire BSS or all nodes in a network to avoid the extended interval frame space (EIFS) interval.

10. The method of claim 9, wherein the short frame comprises a clear to send (CTS) frame.

11. A method, comprising: initiating a transmit opportunity (TXOP) from an access point (AP) with a wireless client device; exchanging one or more frames with the wireless client device during the TXOP at a non-basic rate, the non-basic rate being a rate decodable by both the client and the AP and not decodable by all other nodes in a same basic service set (BSS) as the client and the AP; and transmitting a short frame from the AP at a basic rate configured to truncate the TXOP early, before a network allocation vector (NAV) clears and prior to the end of the TXOP to avoid an extended interval frame space (EIFS) interval, wherein the short frame is an end of transmission (EOT) frame having a receiver address field set to a broadcast address, and wherein the basic rate is a rate decodable by the client, and the AP, and all of the other nodes in the same BSS as the client and the AP, wherein the basic rate is selected such that the frame from the AP reaches the entire BSS or all nodes in a network to avoid an extended interval frame space (EIFS) interval.

12. A system, comprising: a client wireless device including client logic configured to, prior to an end of a pre-existing transmit opportunity (TXOP) between the client and the access point (AP), send an end of transmission (EOT) request to the AP that truncates the TXOP early, before a network allocation vector (NAV) clears around the client; and an AP including AP logic configured to, responsive to receiving the EOT request from the client wireless device, transmit an EOT frame having a receiver address field set to a broadcast address and that is configured to separately truncate the TXOP early, before the network allocation vector clears around the AP prior to the end of the TXOP, such that the EOT frame can be received by all stations in a basic service set (BSS), so that after the EOT frame transmission, all stations in the BSS will resume their backoff at substantially the same time to avoid an extended interval frame space (EIFS) interval.

13. The system of claim 12, wherein the EOT request and the EOT frame each comprises a CF-end frame.

14. The system of claim 13, wherein the CF-end frame comprises a basic service set identification (BSSID) field indicating a BSSID associated with the AP.

15. The system of claim 14, wherein the EOT request is sent at a non-basic rate, the non-basic rate being a rate the client knows to be decodable by both the client and the AP but that the client does not know to be decodable by all other nodes in a same basic service set (BSS) as the client and the AP, and
wherein the EOT frame is sent at a basic rate, the basic rate being a rate decodable by the client, the AP, and all other nodes in the same BSS as the client and the AP.

16. A method, comprising: receiving an end of transmission (EOT) request at an access point (AP) from the client prior to an end of an existing transmit opportunity (TXOP) between the client and the AP, wherein the EOT request truncates the TXOP early, before a network allocation vector (NAV) clears around the client; and transmitting an EOT frame from the AP responsive to receiving the EOT request, wherein the EOT frame has a receiver address field set to a broadcast address from the AP and that is configured to separately truncate the TXOP early, before the network allocation vector clears around the AP prior to the end of the TXOP, such that the EOT frame can be received by all stations in a basic service set (BSS), so that after the EOT frame transmission, all stations in the BSS will resume their backoff at substantially the same time to avoid an extended interval frame space (EIFS) interval.

17. The method of claim 16, wherein the EOT request and the EOT frame each comprises a CF-end frame, the EOT frame and EOT request having matching basic service set identifications (BSSID) fields indicating a BSSID associated with the AP.

18. A method, comprising: sending an end of transmission (EOT) request to an access point (AP) from a client prior to an end of an existing transmit opportunity (TXOP) between the client and the AP, wherein the EOT request truncates the TXOP early, before a network allocation vector (NAV) clears around the client; and receiving an EOT frame at the client wireless device from the AP responsive to transmitting the EOT request, a receiver address field set to a broadcast address and that is configured to separately truncate the TXOP early, before the network allocation vector clears around the AP prior to the end of the TXOP, and can be received by all stations in a basic service set (BSS), so that after the EOT frame transmission, all stations in the BSS will resume their backoff at substantially the same time to avoid an extended interval frame space (EIFS) interval.

19. The method of claim 18, wherein the EOT request and the EOT frame each comprises a CF-end frame,
wherein the EOT request is sent at a non-basic rate, the non-basic rate being a rate the client knows to be decodable by both the client and the AP but that the client does not know to be decodable by all other nodes in a same basic service set (BSS) as the client and the AP, and
wherein the EOT frame is received at a basic rate, the basic rate being a rate decodable by the client, the AP, and all other nodes in the same BSS as the client and the AP.

20. An access point (AP) comprising logic configured to: receive an end of transmission (EOT) request from a client wireless device prior to an end of an existing transmit opportunity (TXOP) between the client and the AP that truncates the TXOP early, before a network allocation vector (NAV) clears around the client; and responsive to receiving the EOT request, transmit an EOT frame having a receiver address field set to a broadcast address and that is configured to separately truncate the TXOP early, before the network allocation vector clears around the AP prior to the end of the TXOP, such that the EOT frame can be received by all stations in a basic service set (BSS), so that after the EOT frame transmission, all stations in the BSS will resume their backoff at substantially the same time to avoid an extended interval frame space (EIFS) interval.

21. A wireless client device comprising logic configured to: prior to an end of an existing transmit opportunity (TXOP) between a client and an access point (AP), send an end of transmission (EOT) request to the AP that truncates the TXOP before a network allocation vector (NAV) clears around the client; and responsive to transmitting the EOT request, receiving an EOT frame from the AP, the EOT frame having a receiver address field set to a broadcast address and configured to separately truncate the TXOP early, before the network allocation vector clears around the AP prior to the end of the TXOP, such that the EOT frame can be received by all stations in a basic service set (BSS), so that after the EOT frame transmission, all stations in the BSS will resume their backoff at substantially the same time to avoid an extended interval frame space (EIFS) interval.

22. An access point (AP) comprising: means for, prior to an end of an existing transmit opportunity (TXOP) between a client wireless device and the AP, receiving an end of transmission (EOT) request from the client wireless device that truncates the TXOP early, before a network allocation vector (NAV) clears around the client; and means for, responsive to receiving the EOT request, transmitting an EOT frame having a receiver address field set to a broadcast address and that is configured to separately truncate the TXOP early, before the network allocation vector clears around the AP prior to the end of the TXOP, such that the EOT frame can be received by all stations in a basic service set (BSS), so that after the EOT frame transmission, all stations in the BSS will resume their backoff at substantially the same time to avoid an extended interval frame space (EIFS) interval.

23. The access point of claim 22, wherein the EOT request and the EOT frame each comprises a CF-end frame.

24. A wireless client device, comprising: means for, prior to an end of an existing transmit opportunity (TXOP) between a client and an access point (AP), sending an end of transmission (EOT) request to an AP that truncates the TXOP early, before a network allocation vector (NAV) clears around the client; and means for, responsive to transmitting the EOT request, receiving an EOT frame from the AP having a receiver address field set to a broadcast address and that is configured to separately truncate the TXOP early, before the network allocation vector clears around the AP prior to the end of the TXOP, such that the EOT frame can be received by all stations in a basic service set (BSS), so that after the EOT frame transmission, all stations in the BSS will resume their backoff at substantially the same time to avoid an extended interval frame space (EIFS) interval.

25. The wireless client device of claim 24, wherein the EOT request and the EOT frame each comprises a CF-end frame.

26. An access point (AP) comprising logic configured to: receive a request to send (RTS) frame from a client wireless device at a non-basic rate, the non-basic rate being a rate decodable by both the client and the AP but is not decodable by all other nodes in a same basic service set (BSS) as the client and the AP; and responsive to receiving the RTS frame, transmit a clear to send (CTS) frame that sets a network allocation vector (NAV) at a basic rate that is configured to truncate a transmit opportunity (TXOP) early, before the network allocation vector clears and prior to the end of the TXOP to avoid an extended interval frame space (EIFS) interval, the basic rate being a rate decodable by the client, the AP, and all of the other nodes in the same BSS as the client and the AP, wherein the basic rate is selected such that the frame from the AP reaches the entire BSS or all nodes in a network to avoid the extended interval frame space (EIFS) interval.

27. A wireless client device comprising logic configured to: transmit a request to send (RTS) frame to an access point (AP) at a non-basic rate, the non-basic rate being a rate the client knows to be decodable by both the client and the AP but that the client does not know to be decodable by all other nodes in a same basic service set (BSS) as the client and the AP; and responsive to transmitting the RTS frame, receive a clear to send (CTS) frame that sets a network allocation vector (NAV) at a basic rate that is configured to truncate a transmit opportunity (TXOP) early, before the network allocation vector clears and prior to the end of the TXOP to avoid an extended interval frame space (EIFS) interval, the basic rate being a rate decodable by the client, the AP, and all of the other nodes in the same BSS as the client and the AP, wherein the basic rate is selected such that the frame from the AP reaches the entire BSS or all nodes in a network to avoid an extended interval frame space (EIFS) interval.

28. An access point (AP) comprising logic configured to: send a short frame preceding the start of a transmit opportunity (TXOP) to a wireless client at a basic rate to set a network allocation vector (NAV), the basic rate being a rate decodable by the client, the AP, and all other nodes in a same basic service sot (BSS) as the client and the AP; to transmit and receive one or more frames during the TXOP with the wireless client at a non-basic rate, the non-basic rate being a rate decodable by both the client and the AP but that is not decodable by all of the other nodes in the same BSS as the client and the AP; and transmit a clear to send (CTS) frame at a basic rate that is configured to truncate the TXOP early, before the network allocation vector clears and prior to the end of the TXOP to avoid an extended interval frame space (EIFS) interval, wherein the basic rate is selected such that the frame from the AP reaches the entire BSS or all nodes in a network to avoid the extended interval frame space (EIFS) interval.

29. An access point (AP) comprising logic configured to: initiate a transmit opportunity (TXOP) with a wireless client device and exchange one or more frames with the wireless client device during the TXOP at a non-basic rate, the non-basic rate being a rate decodable by both the client and the AP but that is not decodable by all other nodes in a same basic service set (BSS) as the client and the AP; and transmit a short frame at a basic rate configured to truncate the TXOP early, before a network allocation vector (NAV) clears and prior to the end of the TXOP to avoid an extended interval frame space (EIFS) interval, the basic rate being a rate decodable by the AP, the client, and all of the other nodes in the same BSS as the client and the AP, wherein the basic rate is selected such that the frame from the AP reaches the entire BSS or all nodes in a network to avoid the extended interval frame space (EIFS) interval.

* * * * *

UNITED STATES PATENT AND TRADEMARK OFFICE
CERTIFICATE OF CORRECTION

PATENT NO.       : 8,374,123 B2
APPLICATION NO.  : 11/557516
DATED            : February 12, 2013
INVENTOR(S)      : Wentink Page 1 of 1

It is certified that error appears in the above-identified patent and that said Letters Patent is hereby corrected as shown below:

In the Drawings

In Fig. 6A, Sheet 6 of 8, delete "606" and insert -- 602 --, therefor.ffffffffff In Fig. 6B, Sheet 6 of 8, delete "AP INITIATED TXOP 606" and insert -- AP INITIATED TXOP 602 --, therefor.

In Fig. 7A, Sheet 7 of 8, delete Tag "704" and insert Tag -- 702 --, therefor.

In Fig. 7A, Sheet 7 of 8, delete " 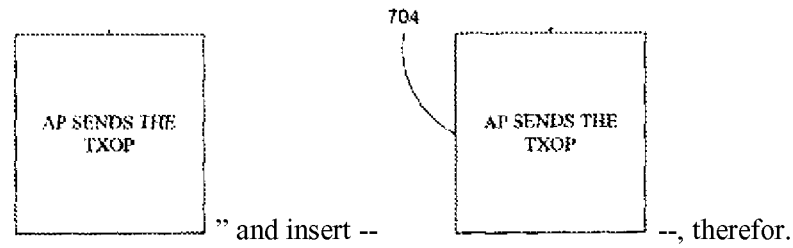 " and insert -- --, therefor.

In the Specifications

In Column 5, Line 4, delete "microprocessor (MCU)," and insert -- microprocessor (MPU), --, therefor.

In the Claims

In Column 8, Line 58, in Claim 8, delete "(TXOPI" and insert -- (TXOP) --, therefor.

In Column 12, Line 27, in Claim 28, delete "sot" and insert -- set --, therefor.

Signed and Sealed this
First Day of April, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,374,123 B2 | Page 1 of 1 |
| APPLICATION NO. | : 11/557516 | |
| DATED | : February 12, 2013 | |
| INVENTOR(S) | : Menzo Wentink | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 477 days.

Signed and Sealed this
Twenty-eighth Day of October, 2014

Michelle K. Lee
*Deputy Director of the United States Patent and Trademark Office*